Dec. 16, 1969  H. HÜTTER  3,483,703
SUPPORT FOR THRUST ENGINE PROPELLANT CHARGE
Filed Oct. 24, 1967

INVENTOR
Heinrich Hütter

By *Mc Glew and Toren*

ATTORNEYS

United States Patent Office 3,483,703
Patented Dec. 16, 1969

3,483,703
SUPPORT FOR THRUST ENGINE PROPELLANT CHARGE
Heinrich Hütter, Munich, Germany, assignor to Bolkow Gesellschaft mit beschrankter Haftung, Ottobrunn, near Munich, Germany
Filed Oct. 24, 1967, Ser. No. 677,668
Claims priority, application Germany, Oct. 28, 1966, 1,285,256
Int. Cl. F02k 9/04
U.S. Cl. 60—255            7 Claims

ABSTRACT OF THE DISCLOSURE

A radial support for the solid propellant charge of a rocket engine with respect to the interior wall of the combustion chamber housing includes a plurality of thin walled supporting elements or slats which are arranged around the circumference of the charge between it and the combustion chamber wall and which bear resiliently between the combustion chamber wall and the charge to support the charge along its entire length. The supporting elements include central curved areas which bear against the charge and outer tip portions at each end which resiliently engage and conform to the surface of either the combustion chamber wall or a lining for such wall. A reversed arrangement includes a construction wherein the central portion of the supporting elements is formed to the curvature of the outer walls and bears against this wall and the end portions of these elements conform to the curvature of the charge and bear against the charge or a covering for the charge. The securing elements advantageously extend along the complete length of the charge within the combustion chamber and are securde in position at each end, preferably be means of securing elements such as bolts.

SUMMARY OF THE INVENTION

This invention relates in general to solid propellant thrust engines, and in particular to a new and useful arrangement for supporting the solid charge within a combustion chamber of a thrust engine such as a rocket.

The present invention is particularly concerned with the provision of a radial support for the solid fuel propellant charge of a rocket engine to hold the charge centrally in respect to the combustion chamber housing such that there will be an annular gap provided which allows for the difference in heat expansion which occurs between the charge and the combustion chamber housing. At the present time the solid charges are supported within the combustion chamber such that an annular gap is formed between the exterior walls of the charge and the interior walls of the combustion chamber by supporting elements such as rings of ductile plastic. A principal purpose of such supporting rings is to absorb differences in expansion between the solid charge and the combustion chamber housing during the burning of the solid charge. However, the elastic supporting rings which are used, because of their poor permanent elasticity, are not capable of withstanding the extreme impact and vibratory stresses which unavoidably result during the transportation of such devices. In addition, such supports do not provide adequate support for the propellant charge during the burning period and also during the storage period, especially when the devices may be subjected to considerable differences between day and nighttime temperatures in storage, as in a dessert zone. Additional supports have been used heretofore, such as corrugated rubber inserts or small rubber tubes which are disposed between the charge and the inner wall of the combustion chamber. A disadvantage of the known devices is that the bearing surfaces are substantially linear or so narrow that great pressures are formed at maximum expansions of the solid charge which will lead to damage or crack formations of the thrust unit housing.

In accordance with the present invention, a support for the solid charge is provided which is functionally reliable under all operating conditions and is simple from a design and manufacturing standpoint. With the inventive construction, a plurality of individual supporting elements or strips are distributed around the circumference of the propellant charge. Such supporting elements comprise thin walled slats or strips which provide a resilient centering and mounting of the charge within the combustion chamber because of their shape and the fact that they are dimensioned so that they will be preloaded when inserted between a charge and the interior wall of a combustion chamber. The strips advantageously include a central curved area which conforms to the exterior circumference of the propellant charge and which bears against the propellant charge substantially along the complete length from the top to the bottom thereof. The outer ends of the strips extend away from the propellant charge and are curved to bear against the conform to the interior wall or a lining of the combustion chamber housing. The curvature of the strips may be reversed so that the centeral area bears against either the housing or a liner therefor and the ends bear against and conform to the configuration of the propellant charge or a heat insulating layer around the charge. The front or upper ends of the strips are advantageously fixed at the igniter of the housing and their rear ends are advantageously fixed at the nozzle entry against movement in an axial direction in respect to the combustion chamber axis such as by securing pins or screws.

Accordingly it is an object of the invention to provide a resilient support for supporting a propellant charge within a cylindrical combustion chamber so that it is spaced from the interior walls of the chamber and resiliently supported therein along substantially its entire length.

A further object of the invention is to provide a resilient supporting arrangement for supporting a propellant charge within a cylindrical combustion chamber of a rocket engine at a spaced location from the interior walls to define an annular gap around the walls which includes a plurality of resilient slat members arranged around the periphery of the charge and resiliently bearing at their central areas against one of either the walls of the combustion chamber or the charge and include end elements which bear against the other of either the combustion chamber wall or the exterior wall of the propellant charge.

A further object of the invention is to provide a thrust engine which includes means for mounting a propellant charge centrally within the tubular combustion chamber in a resiliently centered fashion which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

GENERAL DESCRIPTION OF THE PREFERRED EMBODIMENTS

Figure 1:
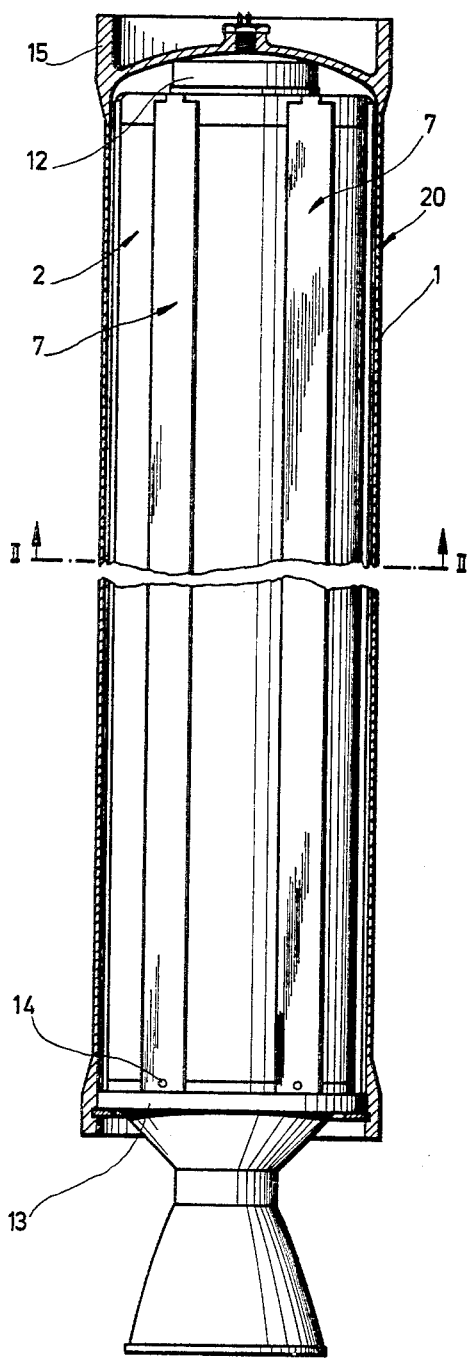
FIG. 1 is a partial longitudinal section of a solid fuel rocket engine constructed in accordance with the invention.
Figure 2:
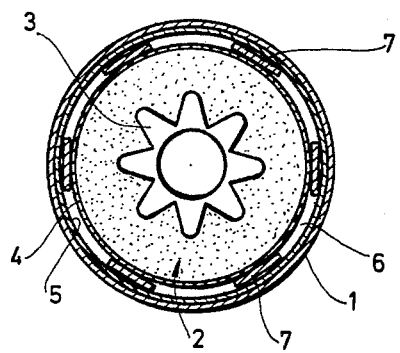
FIG. 2 is a section taken along the line II—II of FIG. 1.
Figure 3:
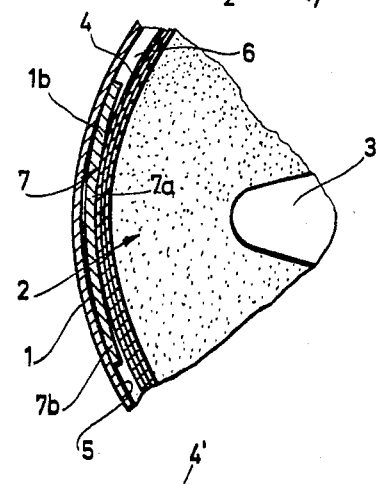
FIG. 3 is a partial section similar to FIG. 2 but on a greatly enlarged scale.

Referring to the drawings in particular, the invention embodied therein in FIGS. 1-3 comprises a rocket engine generally designated 20 which includes a cylindrical combustion chamber 1 in which is located a solid fuel thrust unit or charge 2. The charge 2 is designed as a hollow burner of star-shaped configuration which includes a central chamber 3.

In accordance with the invention, the propellant charge 2 is supported centrally within the combustion chamber housing 1 at a spaced location from the interior walls by means of a plurality of resilient slats or thin-walled spring strips 7 of a steel or other suitable metal. They are applied in a manner such that an annular gap 6 is maintained between the propellant charge 2 and the housing 1 to make possible the absorption of heat expansion differences which will occur between these two parts. In addition, the gap 6 provides a means for filling this space with a gas for the purpose of internal and external pressure equalization at the propellant charge 2.

In the preferred arrangement, a plurality of the slats 7 are equally spaced around the circumference of the charge 2 and are advantageously made of a spring steel or other suitable metal and they are assembled in position under a preloading arrangement.

In the embodiment of FIGS. 1-3, each slat 7 includes a central area 7a which has its inner surface conforming to the exterior surface of the propellant charge 2 or the outside surface 4 of a material bounding the charge or an insulation. Each slat 7 also includes outer end portions 7b, 7b which extend away from the charge 2 and bear against the inner wall 5 of the combustion chamber 1 and are shaped to the configuration of this wall adjacent each end 7b. The slats 7 are inserted so that they bear under preloading in opposite directions against the wall 5 of the combustion chamber and the exterior wall 4 of the propellant charge 2, respectively, in order to support the charge centrally within the combustion chamber and leave the annular gap 6.

It should be appreciated that the curvature 7a may be made in an opposite manner such that the slat 7 bears centrally outwardly against the wall 5 and the ends 7b, 7b bear inwardly against the wall 4 of the propellant charge 2.

Figure 4:
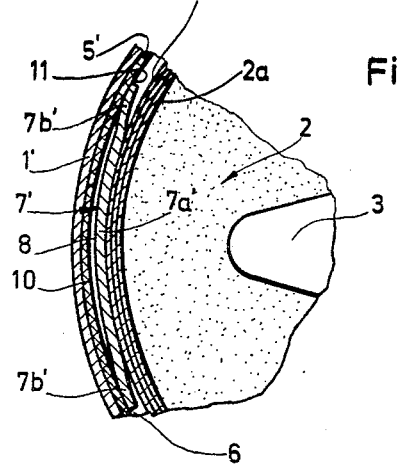
FIG. 4 is a view similar to FIG. 3 of another embodiment of the invention.

In FIG. 4, the interior wall of the combustion chamber housing 1' is lined with a heat insulation layer 10 and the strip elements 7' have outer ends 7b', 7b' which conform to the curvature of the heat insulation walls 10. Similarly the charge 2 is provided with a heat insulation wall 2a presenting an exterior surface 4' and the central section 7a' is made to conform to this curvature.

In order to secure the slats 7 and 7' against movement in an axial direction, their front or upper ends are fastened to ignite a housing 12 or to a cover 15 for the combustion chamber 1 and their rear ends are secured to a nozzle inlet 13 by means of securing pins or screws 14.

The invention guarantees an elastic support for the thrust unit which, even when the annular gaps for the absorption of maximum heat expansion differences are relatively wide, is functionally reliable and, in particular, centers the thrust unit over its entire expansion area perfectly. This is of great importance for a uniform filling of the annular gap with gases for the purpose of pressure equalization during the burning period. Another advantage the invention offers is that, during the expansion of the thrust unit, as the spring counter force increases, the carrying area between the central area of the spring strips 7 and the peripheral surface of the charge 2 or the surface of the insulating layer 2a surrounding the latter, which becomes softer with rising temperature, also increases so that the specific load remains within permissible limits just the same. Generally, the specialist is given a possibility through the invention to adapt the support of the thrust unit to all occurring load conditions by appropriate selection of the width (distance across the circumference) and the thickness of the spring strips. Furthermore, the invention provides for maximum utilization of the volume of the combustion chamber housing at relative minimum annular gap width.

While specific embodiments of the invention have been shown and described in detail to illustrate the application of the inventive principles, it will be understood that the invention may be embodied otherwise without departing from such principles.

What is claimed is:

1. A thrust engine comprising a housing having a tubular wall defining a combustion chamber with a closed end and a nozzle adjacent the opposite end for the discharge of thrust gases, a solid propellant charge substantially coextensive in length to the combusion chamber and located within said combustion chamber, and a plurality of longitudinally elongated relatively wide resilient slats distributed around the circumference of said propellant charge and extending along the complete length thereof and having a longitudinally extending central portion resiliently bearing against and conforming to the shape of said propellant charge and a side portion of each side of said central portion and coextensive in length therewith in resilient engagement with said combustion chamber wall, said slats resiliently centering said propellant charge within said combustion chamber at a spaced location from said combustion chamber wall.

2. A thrust engine, according to claim 1, wherein said slat central portion is curved and is of a curvature corresponding to the curvature of the exterior of the propellant charge and bears against said propellant charge, said end portions being offset outwardly from said curved central portion and bearing against and conforming to the curvature of said combustion chamber wall.

3. A thrust engine, according to claim 1, including a heat insulating layer arranged at the interior of said tubular wall and bounding said combustion chamber, said slat central portion being biased against said propellant charge by said end portions which engage against and conform to the curvature of said insulating layer.

4. A thrust engine according to claim 1, wherein said slats are distributed around the circumference of said charge in a manner such that they will be spaced from each other.

5. A thrust engine according to claim 1, wherein said tubular wall is closed at the end opposite from said nozzle by a cover, said slats extending substantially along the length of the interior of said combustion chamber and being secured to said cover at their one ends and to said nozzle at their opposite ends.

6. A thrust engine according to claim 1, including an igniter arranged at the end of said charge opposite to said nozzle, and means securing said straps at their one ends to said igniter and at the opposite ends to said nozzle.

7. A thrust engine according to claim 1, wherein said solid propellant charge includes a star-shaped interior wall defining a central inner chamber of said charge.

References Cited

UNITED STATES PATENTS

| | | | |
|---|---|---|---|
| 1,179,300 | 4/1916 | Hales | 217—54 |
| 1,440,175 | 12/1922 | Riabouchinski | 60—255 |
| 2,591,676 | 4/1952 | Clayton | 60—39.32 XR |
| 2,795,108 | 6/1957 | Saldin | 60—39.31 |
| 3,032,975 | 5/1962 | Alden | 60—255 |
| 3,319,424 | 5/1967 | Haake | 60—255 |

FOREIGN PATENTS 147,199  10/1954  Sweden.

CARLTON R. CROYLE, Primary Examiner

U.S. Cl. X.R.

60—39.32, 39.47